UNITED STATES PATENT OFFICE 2,615,033

SILOXANES PRODUCED BY HYDROLYSIS OF HALOGEN SUBSTITUTED SILACYCLOHYDROCARBONS

Joseph M. Hersh, New York, N. Y., assignor to Continental Oil Company, Ponca City, Okla., a corporation of Delaware No Drawing. Application March 8, 1949, Serial No. 80,315

5 Claims. (Cl. 260—448.2)

This invention relates as indicated to organo cyclosilicon condensation products and relates not only to such products as new materials per se, but also to improved methods for the manufacture of such materials. This application is a continuation-in-part of Serial No. 600,239, filed June 18, 1945, now Patent No. 2,464,231, issued March 15, 1949.

It is a further and more particular object of this invention to provide novel compositions of matter including the above identified products as an essential constituent.

Other objects of the invention will appear as the description proceeds.

To the accomplishment of the foregoing and related ends said invention then comprises the features hereinafter fully described and particularly pointed out in the claims, the following description setting forth in detail certain illustrative embodiments of the invention, these being indicative, however, of but a few of the various ways in which the principle of the invention may be employed.

The monomeric heterocyclic silicon compounds to which the present invention relates have the following characterizing structures:

*Formula 1*

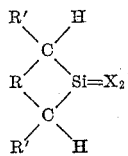

In their hydrolyzed and condensed form, the resulting compounds therefrom are represented by the following structural formula:

*Formula 2*

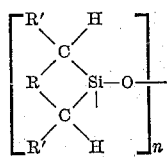

In Formula 1 above, X represents a hydrolyzable and/or condensable radical, and is a halogen or hydroxyl radical.

In Formula 2 above, O is the element oxygen.

In each of the foregoing formulae, R' is hydrogen or halogen, Si denotes a silicon atom and C is a carbon atom.

In each of the foregoing Formulae 1 and 2, R is an organic radical or more particularly, a halogenated or a halogen free hydrocarbon radical which is saturated or unsaturated, such as for example, alkylene, alkenylene, arylene, aryl acyclic, alkarylene, heterocyclic, etc., or an organic radical containing one or more atoms of halogen with the following representative radicals which will be found present in the preferred compounds of this invention: (a) acyclic radicals (straight or branched chain) e. g., propylene, amylene, 1-butenylene, isobutylene, 1-pentenylene, hexylene, 1-hexenylene, octylene, the isomeric amylenes, the isomeric hexylenes, the isomeric heptylenes, etc.; (b) arylene radicals, e. g., phenylene, diphenylene, naphthylene, anthracylene, etc.; (c) arylacyclic radicals, e. g., phenylpropylene, phenyl-propenylene—1, diphenyl-butylene, phenyl-hexenylene — 2, phenyl-hexenylene—3, polystyrylene, etc.

A preferred class of this type of radical are those in which an aryl radical is substituted in an aliphatic carbon chain such as 1-3, 1-4 and preferably 1-5 diarylalkanes from which highly active dihalides may be formed: (d) alkarylene radicals, e. g., methyl-phenylene, propyl-phenylene, 1-propenyl-phenylene, amyl-phenylene, 2-pentenyl-phenylene, cetyl-phenylene, dodecyl-naphthenylene, wax-phenylene, wax-diphenylene, etc.; (e) carbocyclic radicals, e. g., cyclopentylene, cyclopentenylene-1, cyclohexylene, cyclo-hexenylene—1, cyclobutylene, methyl-cyclopentenylene, di-cyclohexylene, phenyl-cyclopentylene, wax cyclohexylene, etc.; (f) heterocyclic radicals, e. g., furylene, pyridylene, thienylene, phenyl-furylene, octadecyl-furylene, etc.

In Formula 2 above, n is an integer equal to at least 2.

EXAMPLE I.—SYNTHESIS OF TETRA CHLORO SILACYCLANES

These compounds having the following representative structure, viz:

*Formula 3*

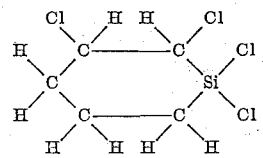

may be prepared by a procedure represented by the following:

Into a reaction vessel fitted with a reflux condenser, mechanical stirrer and reactant entry port, 2.5 molal parts of clean magnesium chips and 5 to 10 volumes of anhydrous ether (based upon the halide to be used) and stirred and warmed while one molal volume of 1,5 dichloropentene-1 is added, at first undiluted and slowly; then, as the Grignard reaction proceeds, more rapidly and with anhydrous ether diluent until all the halide has been added. The reactant may require warming at the start or the addition of a reaction promoter such as a crystal of iodine or a drop or two of an active alkyl iodide such as ethyl iodide. When the reaction has started, the reactor should be strongly cooled to maintain only a slight, regular reflux of ether. Cooling is then gradually withdrawn and heating reinstituted to maintain an even ether reflux for three hours. The Grignard compound separates as an oily bottom layer. Then with rapid stirring and sharp cooling, such as with an ice-brine bath around the reactor, one molal part of silicon tetrachloride in ether solution is added slowly. Finely divided insoluble magnesium salts separate from the solution and the reaction is essentially complete when the silicon halide has been added and well stirred. The organo-silicon product is essentially 1,1 dichloro 1-silacyclohexene. However, some monochloride and some trichloride are present. For many purposes the mixed halo silacyclohydrocarbons, essentially the dichloride, may be hydrolyzed directly. I prefer to separate an essentially pure di-halo silacyclohydrocarbon, in this case, in order to prepare a preferred primary heterocyclic silicone by hydrolysis.

The reaction product is transferred under as near anhydrous conditions as possible to a distillation vessel, decanting the liquid from the separated solids. The solids are washed with anhydrous ether which is added to the product. By distillation at atmospheric pressure the ether is removed; then the product is fractionated to remove essentially pure 1,1 dichloro 1-silacyclohexene, a clear liquid boiling at 155–175° C. at atmospheric pressure or at lower temperatures under reduced pressure. Fractionation is preferably at reduced pressure.

The essentially pure 1,1 dichloro 1-silacyclohexene obtained by fractionation is chlorinated with care. The reaction vessel is fitted with a heater and cooler with an entry point for chlorine. In some instances a quantity, ranging from 1 to 10, of an inactive diluent, such as carbon tetrachloride or the like, may be blended with 1,1 dichloro 1-silacyclohexene. When introducing chlorine for reaction with the unsaturated carbon atoms, an inert gas, such as nitrogen, carbon dioxide and the like, may be used in the weight ratio of 0.5 to 1 or 1 to 1 or as much as 10 to 1 or more to lower the reaction temperature and also increase the yield.

Undiluted cyclo-pentene-1 silicon dihalide is heated to a temperature of 75° C. and a small portion of an equal weight ratio of chlorine and nitrogen is added. Upon chlorination the temperature is increased and then carefully lowered with the cooler coil. The quantity of the reactant used is determined by the cooling effect of the coil until the liquid temperature is held in a range of approximately 60° C. to 70° C.

Starting with a weight of 167 parts of 1,1 dichloro 1-silacyclohexene, a weight of 72 parts of chlorine and the equal volume of nitrogen was added over a five and one-half hour period with the temperature control held in the range of 60° C. to 70° C. During the last half hour of adding the chlorine-nitrogen gas the chemical reaction had very gradually decreased and for the first time a small amount of chlorine was found in the release from the vessel. The chlorinated liquid was distilled under vacuum, discarding the first 1.0% of overhead, and with the next 91% overhead having a constant vaporizing temperature, it was held for synthesis, and the remaining 8% bottoms were discarded.

Upon chemical analysis of the retained overhead liquid, the following results were obtained:

|  | Per cent |
|---|---|
| Chlorine | 59.6 |
| Silicon | 11.8 |
| Carbon | 25.1 |

Instead of using 1,5 dichloropentene-1 in the preparation of the heterocyclic silicon compound, any reactive dihalide may be used as (a) 1,4 dibromobutene-1, (b) 1,4 dibromobutane, (c) 1,4 dichloro-2-phenylbutene-1, (d) 1,4 dichloro-2-phenylbutane, (e) 1,4 dichloro-2,3-dibutene-1 butane, (f) 1,4 dichloro-2,3-dimethylbutane, (g) 1,5 dibromo-4-pentyl pentene-1, (h) 1,5 dibromo-2-methyl pentane, (i) 1,5 dibromopentane, (j) 1,6 di-iodohexene-1, (k) 1,6 di-iodohexane, (l) 1,2 dichloro-5-monochloromethyl benzene, (m) 1,2 monochloro methyl benzene, (n) 1,3 monochlorobutene-1 benzene, (o) 1,5 monochloro-2-pentene-1 benzene, (p) 1,4 dibromo-3-butyl butene-1, (q) 1,4 dibromo-2-methylbutane, (r) p-chlorobenzyl chloride, (s) m-chlorobenzyl chloride, (t) p-dibromobenzene, (u) m-bromo phenethyl chloride, (v) m-di-iodotoluene, (w) m-di-iodo-4-pentene-1 benzene, (x) 1-chloro-4-bromobenzene, (y) 1,4 dichloro-naphthalene, (z) 1,4 dichloro-5-pentene-1 naphthalene, (aa) 2,3 dibromo 6,7 dipentene-1 naphthalene, etc., or any of the class of halogenated organic radicals shown in R above.

The preferred halide reactant should be in a carbon chain of at least three carbon atoms and preferably five carbon atoms such that the heterocyclic silicon structure formed has a maximum stability inherent in forming and being part of a 4 to 6 or more membered ring.

Example II.—Hydrolyzed Tetra Halo Silacyclohydrocarbons

When the 1,1,2,3 tetrachloro silacyclohexane as per Example I above is hydrolyzed in accordance with the improved process of my invention, a product having the following representative structure is produced:

Formula 4

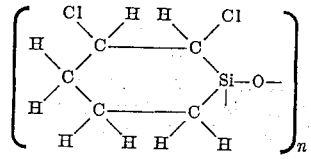

where $n$ is not more than 5.

The product is a low molecular weight mobile liquid and not a high molecular weight hard resin as the sole product of hydrolysis of the 1,1,2,3 tetrachloro silacyclohexane.

These products may be identified for convenience as primary heterocyclic silicones. A representative manner in which these primary heterocyclic silicones may be prepared in accordance with my invention is as follows:

The 1,1,2,3 tetrachloro silacyclohexane from Example I is dissolved in from 2 to 3 volumes of a low boiling inert solvent such as benzene and gradually added to a well stirred bath of ice-water or ice-brine with careful control so that hydrolysis is effected with a minimum of condensation. The product is extracted with benzene (the solvent used above) and concentrated in the benzene solution or recovered from the benzene by distilling off the solvent. The removal of benzene by vacuum distillation effects both a cooling of the reactants and a more complete controlled hydrolysis by the concomitant removal of volatile hydrogen halides.

The molecular weight of the finished product may be determined by the:
(1) Cryoscopic method in a solvent, for example benzene, or by the
(2) Ebullioscopic method in a selection of various solvents, as for example (a) benzene, (b) chloroform By using these related methods, the combined average molecular weight of each of the finished products obtained by hydrolysis, or the resulting halogen bearing oily polymer shown in Formulas 4, 6, 7, 8, 9, 10, 11, 12 and 13, are given in Table I.

EXAMPLE III.—CONDENSED PRIMARY HETEROCYCLIC SILICONES

The primary halo heterocylic silicones prepared by the improved hydrolysis method of my invention, as represented by Example II above, may be condensed to form products having a structure like that given in Formula 4 above excepting that $n$ in this case is from 5 to 50. A representative and preferred procedure in the preparation of such products which may be referred to for convenience as the intermediate polymer of the heterocyclic silicone, having a molecular weight of from 600 to 6000, is as follows:

The primary halo heterocyclic silicone from Example II, preferably diluted with an equal volume of a non-condensable hydrocarbon solvent such as a straight run paraffinic naphtha is treated with one volume of concentrated sulfuric acid and warmed gently with stirring until an apparently uniform solvent is obtained. The reaction mixture is allowed to remain in contact for a requisite time to obtain the desired degree of condensation. For a lower molecular weight polymer where $n$ is from 5 to 50 about one-half hour of contact is sufficient. The product is then diluted with water to release the condensing agent, washed with dilute caustic solution when an acidic condensing agent has been used, separated and dried.

The oily product produced by the procedure just described may be separated from the hydrocarbon solvent but in most cases it will be found preferable to utilize the hydrocarbon solution of the cyclo-silicone for the purposes hereinafter more specifically explained for which these end products have been found to be particularly useful.

EXAMPLE IV.—SYNTHESIS OF HALO ARYL SILACYCLOHYDROCARBONS

The aryl silacyclohydrocarbons and halogen derivatives thereof come within the meaning of Formula 1 and descriptions subsequent thereto. A representative member of the class wherein R comprises an aryl grouping is illustrated in the following Formula 5:

Formula 5

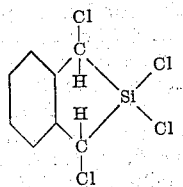

1,2,2,3 tetrachloro 2-silaindane which may be prepared by the procedure represented by the following:

A reaction vessel fitted with a reflux condenser, mechanical stirrer and reactant entry port, 5 molal parts of clean magnesium chips and 10 to 20 volumes of anhydrous ether (based upon the halide to be used) are stirred and warmed while two molal volumes of 1,2 monochloromethyl benzene (as shown in Example I–m above) is added, at first undiluted and slowly; then, as the Grignard reaction proceeds, more rapidly and with anhydrous ether diluent until all of the halide has been added. The reaction may require warming at the start or the addition of a reaction promoter such as an active alkyl iodide and the like, including ethyl iodide. When the reaction has started, the reactor should be strongly cooled to maintain only a slight, regular reflux of ether. Cooling is then gradually withdrawn and heating reinstituted to maintain an even ether reflux for three hours. The Grignard compound separates as an oily bottom layer. Then with rapid stirring and sharp cooling, such as with an ice-brine bath around the reactor, two molal parts of silicon tetrachloride in ether solution is added slowly. Finely divided insoluble magnesium salts separate from the solution and the reaction is essentially complete when the silicon halide has been added and well stirred. The organo-silicon product is essentially 2,2 dichloro 2-silaindane as shown above.

The reaction product is transferred under as near anhydrous conditions as possible to a distillation vessel, decanting the liquid from the separated solids. The solids are washed with anhydrous ether which is added to the product. By distillation at atmospheric pressure the ether is removed; then the product is fractionated to remove essentially the 2,2 dichloro 2-silaindane. This is accomplished by discarding the first one and a half 1.5% overhead vapor and retaining the remaining 87% which will be halogenated and hydrolyzed as shown later.

Halogen, in this instance using chlorine, is chemically attached to the two methyl carbons by direct use of chlorine without placing chlorine on the benzyl carbons. Upon heating to a high temperature like 200° C. to 300° C. or a little higher, the elemental chlorine introduced will release HCl and replace one atom of hydrogen on the methyl carbons, but the yield would be in the range of 50% to 75% depending on the temperature employed. Using a small amount of aluminum or ferric halides as a catalyst, the yield would be much higher, ranging above 90% and as a rule approximately 99%.

To one mole weight of 2,2 dichloro 2-silaindane as shown above was added 0.1 mole weight of ferric chloride and the mixture heated to 100° C. To this heated mixture, 4.01 mole weight of chlorine was slowly distributed near the bottom of the liquid in the vessel. During chlorination, the weight volume of HCl vapor released during chlorination was determined which shows that one atom of chlorine in the HCl released covers attaching one atom of chlorine to the methyl carbons. When the chlorination was completed, the chemical analysis of the finished product gave these results:

| | Per cent |
|---|---|
| Chlorine | 60.1 |
| Silicon | 11.7 |
| Carbon | 25.2 |

EXAMPLE V.—HYDROLYZED DICHLORO DIHALO SILACYCLOHYDROCARBON

The dichloro dihalo silacyclohydrocarbon as per Example IV above was hydrolyzed in accordance with the improved process of my invention, to yield a product having the following representative structure:

*Formula 6*

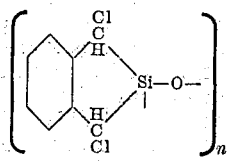

where $n$ is not more than 10.

The product is a mobile liquid, clear in color and heat stable in nature.

A representative manner in which these may be prepared in accordance with my invention is as follows:

The 1,2,2,3 tetrachloro 2-silaindane as shown in Example IV is dissolved in from 3 to 4 volumes of a low boiling inert solvent, such as benzene and gradually added to a well stirred bath of ice-water or ice-brine with careful control so that hydrolysis is effected with a minimum of condensation. The product is extracted with toluene (a solvent used above) and concentrated in the toluene solution or removed from the benzene by distilling off the solvent. The removal of toluene by vacuum distillation effects both cooling of the reactants and a more complete controlled hydrolysis of the concomitant removal of the volatile hydrogen halides.

The foregoing examples represent methods of synthesis which, along with related methods, may be used in preparing the general type of halogen bearing heterocyclic silicone polymers as mentioned herein. Some of the other specific chemical polymers coming within the general term are

*Formula 7 (Example I-e)*

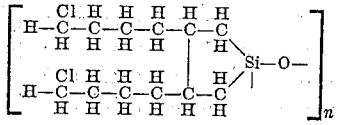

where $n$ is not more than 20

*Formula 8 (Example I-j)*

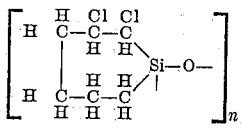

where $n$ is not more than 10.

*Formula 9 (Example I-o)*

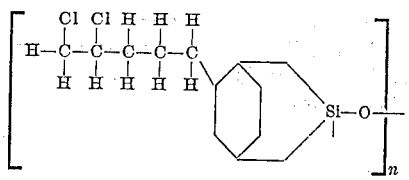

where $n$ is not more than 5.

*Formula 10 (Example I-y)*

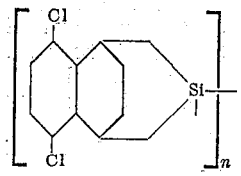

where $n$ is not more than 5.

*Formula 11*

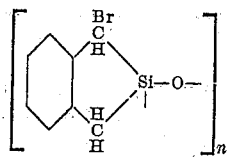

where $n$ is not more than 5.

*Formula 12*

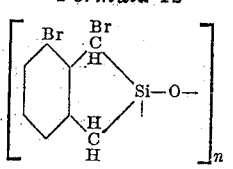

where $n$ is not more than 5.

*Formula 13*

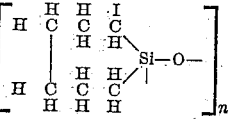

where $n$ is not more than 5.

TABLE I

| | Average molecular weight |
|---|---|
| Formula 4 | 770 |
| Formula 6 | 1950 |
| Formula 7 | 5700 |
| Formula 8 | 1568 |
| Formula 9 | 1035 |
| Formula 10 | 1200 |
| Formula 11 | 1025 |
| Formula 12 | 1520 |
| Formula 13 | 1265 |

In the procedure outlined above, concentrated sulfuric acid has been referred to as the condensing agent. The strength of the condensing agent may be varied with the activity of the condensing agent and the ease of effecting condensation. With the lower molecular weight dihalo silacyclohydrocarbons or the related primary silicones, condensation takes place quite readily so that a more dilute condensing agent and a shorter period of time may be employed for the controlled polymers. With higher molecular weight heterocyclic silicones and their halide derivatives the condensation is more readily controlled and the use of concentrated agents is preferred. Heat alone may be used to effect the condensation, but the avoidance of thermal dissociation, the greater homogeneity of the condensed product and the more accurate control of condensation by chemical condensing agents makes this the preferred means for carrying out the desired reaction. It will generally be found preferable to employ a chemical condensing agent such as the following: $H_2SO_4$, $HSO_3Cl$, $HSO_3F$, $H_3PO_4$, $H_4P_2O_7$, $HPO_3$, $P_2O_5$, $P_2S_5$, $PCl_3$, $PCl_5$, $ZnCl_2$, $CoCl_2$, $MnCl_2$, $FeCl_3$, $AlCl_3$, $AlBr_3$, $HF$, $BF_3$, $HI$, etc. and for conciseness, these are hereafter referred to as "acid-acting chemical condensing agents."

The length of time during which the primary heterocyclic silicones are exposed to the condensing action of any of the chemical agents listed above will determine the degree of condensation which takes place. Thus by controlling the degree of condensation of a condensable heterocyclic silicone, as readily measured by molecular weight or viscosity change, I produce a selected compound having an optimum polymeric structure for a specific use. Upon attaining the desired degree of condensation, the condensable mass is freed of the condensing agent (by water washing if it is a chemical agent) and inhibited from further undesirable condensation by storage at low temperature and in solution in a non-condensing hydrocarbon medium, or preferably by the action of condensation inhibitors which are of the class of organic compounds miscible with the condensed silicone or thiosilicone having a labile group such as the alcohols, esters, amines, phenols, or aminophenols. Ethyl alcohol, isopropyl amine, certain ethanol amines, ethyl silicate, ethyl borate, phenol, p-aminophenol, N-tert butyl p-amino-phenol, phenyl silicate, ethyl acetate and the like are effective in this function to a desirable degree. The condensation inhibiting agent is generally present in a ratio of from 1 to about 10 per cent of the condensed silicone. Prior to using the stabilized condensed silicone, the inhibiting agent may be removed, for example, by extraction with water, acetone, caustic or dilute acid solution depending upon the nature of the agent present. For many purposes, however, the ester or alcohol though generally not the amine inhibitors may act in a cooperating function with the heterocyclic silicone, such that its removal from the condensed silicone need not be undertaken and in fact may advantageously be avoided. Thus a small amount of ethyl alcohol or ethyl silicate, for example, may be tolerated in an oily system in which the condensed silicone is used to control frothing in the processing of an oily-organic mixture as disclosed in my copending application, Serial No. 564,705, now abandoned. Similarly, small amounts of the more lyophilic condensation inhibitors may be tolerated in the lubricant composition incorporating condensed organo silicon compounds as disclosed in copending applications Serial Nos. 527,136, 527,137, 564,703, and 519,188, all now abandoned. I have thus prepared stable, homogeneous and versatile heterocyclic silicones of from 500 to 10,000 molecular weight.

The various materials referred to above will be found to be preferable for use as compared with the silicones and halogenated silicones of the prior art, which relate to the preparation of resinous materials, either aliphatic or aromatic in which the silicone structure has no heterocyclic silicon nucleus. For example, the methyl silicones are resinous materials having from 1 to 2 methyl groups per silicon atom and the ethyl silicones have from ½ to 1½ ethyl groups per silicon atom. These compounds are especially resinous in character as described in numerous publications. The compounds contemplated by the present invention are of a heterocyclic structure in which silicon is bound in an organo-carbon ring. This structure thus simulates an aryl-silicane of extremely high stability, but is different in that the silicon is part of the ring. Instead of having alkyl or aryl groups attached to silicon by a single valence bond, the system of compounds to which this invention relates has an organic chain linked to silicon by two valences. Thus molecular complexity is built up in the heterocyclic organo constituents of silicon to an extent not shown in the prior art. This characteristic of molecular complexity affects the physical and chemical properties of the compositions so prepared, especially their solubility in hydrocarbon type solvents and oils, their surface active effect in oil or hydrocarbon solutions such as influences their antifrothing or anti-foaming properties, and especially their chemical stability. This series of compounds has these outstanding and other differences from the known organo-silicones of the art.

By the linking of a carbon chain of at least three carbon atoms to silicon by two valences in a cyclic structure of at least four unit members, the molecular structure is stabilized and made more complex through internal linkages. For example, in the dihydrocarbon silicols of the prior art, such as $R_2Si(OH)_2$, the presumed diol is very readily condensed to form a silicon structure in which a two-dimensional polymeric unit is produced, forming a resinous compound quite readily. In the system of compounds to which this invention relates, the added structural complexity of the carbon-silicon-carbon heterocyclic structure gives a more stable and less condensable three-dimensional polymer providing a more versatile material in lower molecular weight. Similarly, in the $R_3Si—X$ compounds, where X is halogen or hydroxyl which is condensable, the condensed material is a dimeric linear polymer. However, in the heterocyclic structure of this invention, the cyclic portion of the silicon compounds offer substantially greater three-dimensionality to the polymer, than the non-cyclic type of polymer known in the art.

While methyl and ethyl halides have low boiling points such that a reaction involving these compounds requires pressure vessels and particular low temperature handling such as will normally preclude a rapid and favorable reaction rate, the alkyl dihalides or the aryl dihalides of organic compounds having three or more carbon atoms in which the two halogen atoms are separated by at least three carbon atoms employed herein are high boiling, safe liquids which are active with silicon halides and do not require low temperature handling or pressure vessels in bringing about the reactions involved. Thus, dihalides used in the present invention may be coupled with the silicon reagent by means of the active coupling metals such as lithium, sodium, potassium, and potassium-sodium alloy, and the like, in inert solvents such as benzene, toluene xylene, and the like, at elevated temperatures under which conditions the active metals are molten and finally dispersed and, therefore, in a most active state. By this means the heterocyclic silicon compounds are advantageously formed at a relatively low cost.

The compounds produced in accordance with my invention have a wide variety of uses. The lower polymeric forms are particularly useful for purposes such as:

(a) Anti-foam agent in blended heavy duty oils in concentrations of from .00001 per cent to 0.1 per cent, which concentration effectively eliminates foaming in such lubricants under conditions of mechanical agitation.

(b) Anti-frothing agents in oily-organic processing systems in concentrations of from 0.0001 percent to 0.1 per cent, which concentrations are effective in eliminating or controlling frothing in various oily-organic processing systems such as the vacuum distillation of lube oil stocks, dehydration of oils, soap formation in the neutralization of fatty acids and organic acids, rendering of fats and the like, dehydration and deaeration of greases, halogenation, hydrogenation, dehalogenation, and dehydrogenation of oils, fats, and waxes, etc.

In certain lubricating compositions concentrations of the condensed heterocyclic silicones of from 0.1 per cent to 10 per cent or more may be used as viscosity improving agents and stabilizing agents. In this range of concentrations, I have found that the halogen-bearing or halogenated silicones have excellent extreme pressure and load carrying properties such that a composition containing 0.1 per cent or more of the halogen bearing silicones show high Timken load test. The heterocyclic silicon compounds are particularly effective in this regard when the halogen (preferably chlorine) atom or atoms are attached to carbon atoms in the alpha or primal position relative to the silicon atom. For example in the generic formula of the heterocyclic silicones as shown in Formula 2

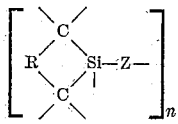

the halogenated species have the highest order of effectiveness as extreme pressure agents when the group designated as "C" above contain halogen. The secondary position for halogen substitution, but still of outstanding importance is on a carbon atom beta to the silicon atom, whether this be in the heterocyclic silicon ring or on a side chain such as an R' group attached to "C." The halogen atoms so substituted have a controlled activity which apparently gives them the degree of instability suited to overcoming metal seizure under the conditions of boundary lubrication.

When additional quantities of halogens are introduced in the heterocyclic silicon structure, these polyhalogenated heterocyclic silicones form an extremely viscous, tough thermotropic composition having high resistance to ignition and to attack by insects or fungi. These compositions serve as excellent fire-proofing, fungus and insect-proofing components of impregnating or coating baths for fabrics, ropes, organic plastics, wood and other susceptible construction materials.

The higher polymeric forms of the compounds of my invention are useful for a wide variety of purposes such as for electrical insulation coating, impregnating, etc.

The heterocyclic silicon condensation products of the present invention, and particularly those in which $n$ is from 5 to 50, are especially adapted for use in lubricating compositions comprising a mineral lubricating oil to which there has been added a material which has the property of increasing the foaming tendencies of the oil. The materials of the present invention will be found particularly useful when combined with products, such as those disclosed in U. S. Patents Nos. 2,197,833; 2,197,834; 2,197,835; 2,228,661; and 2,228,671, the materials of such patents being generically classifiable as phenates and are customarily employed in lubricating compositions for the purpose of increasing the detergency of the oil. Another class of detergents with which the compounds of the present invention may be advantageously employed in combination are the sulphonates, that is, the metallic salts of sulphonic acids and particularly the oil-soluble metallic salts of petroleum sulphonic acids.

For an additional list of usages to which the compounds of the present application are particularly applicable, reference may be had to the copending applications Serial No. 564,705, filed November 22, 1944; Serial No. 538,204, filed May 31, 1944; Serial No. 564,703, filed November 22, 1944; Serial No. 519,188, filed January 21, 1944; Serial No. 527,137, filed March 18, 1944; Serial No. 527,136, filed March 18, 1944, in each of which applications I am either a sole or joint inventor, all now abandoned.

Other modes of applying the principle of the invention may be employed, change being made as regards the detail described, provided the features stated in any of the following claims, or the equivalent of such, be employed.

I therefore particularly point out and distinctly claim as my invention:

1. As a new composition of matter, a compound having the structure

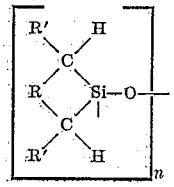

wherein $n$ is an integer of about 5 to 50, R is a radical selected from the group consisting of hydrocarbon radicals, halogenated hydrocarbon radicals containing not more than two halogen atoms, furylene, pyridylene and thienylene radicals, R' is selected from the group consisting of halogen and hydrogen, the total number of halogen atoms in the compound in monomeric form being at least one and not more than four.

2. As a new composition of matter, a compound having the structure

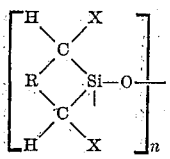

wherein $n$ is an integer of about 5 to 50, R is a halogenated hydrocarbon radical containing not more than two halogen atoms and X is halogen.

3. As a new composition of matter a compound having the structure:

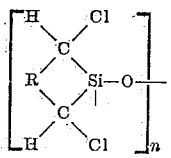

wherein $n$ is an integer of about 5 to 50 and R is a chlorinated hydrocarbon radical containing not more than two chlorine atoms.

4. As a new composition of matter, a compound having the structure

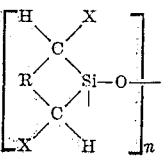

wherein $n$ is an integer of about 5 to 50, R is a hydrocarbon radical, and X is halogen.

5. As a new composition of matter a compound having the structure:

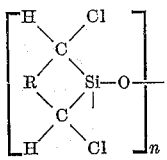

wherein $n$ is an integer of about 5 to 50 and R is a hydrocarbon radical.

JOSEPH M. HERSH.

REFERENCES CITED

The following references are of record in the file of this patent:

UNITED STATES PATENTS

| Number | Name | Date |
|---|---|---|
| 2,416,504 | Trautman | Feb. 25, 1947 |
| 2,435,148 | McGregor | Jan. 27, 1948 |
| 2,464,231 | Hersh | Mar. 15, 1949 |

OTHER REFERENCES

Bygden, Berichte der Deut. Chem. Gess., vol. 48 (1915), pp. 1236–1242.